2,785,166
ETHERS OF HETEROCYCLIC ALCOHOLS AND TETRAHYDROISOQUINOLINEALKANOLS, THEIR SALTS AND METHODS FOR THEIR PRODUCTION

John W. Cusic, Skokie, Ill., assignor, by mesne assignments, to G. D. Searle & Co., Skokie, Ill., a corporation of Delaware No Drawing. Application October 25, 1954,
Serial No. 464,602

11 Claims. (Cl. 260—288)

The present invention relates to a new group of ethers of heterocyclic alcohols and tetrahydroquinolinealkanols, their salts and methods for their production. More specifically, the invention relates to the compounds of the general structural formula

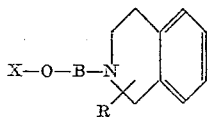

and their non-toxic salts, wherein B is a lower alkylene radical, R is a member of the class consisting of hydrogen and lower alkyl radicals, and X is a member of the class consisting of the pyridine radical and radicals of the type $$Y\text{—}A\text{—}$$

wherein A is a lower alkylene radical and Y is a member of the class consisting of pyridyl, thienyl, furyl, and tetrahydrofuryl radicals.

The aforementioned lower alkylene groups A and B represent such lower bivalent hydrocarbon radicals as methylene, ethylene, propylene, butylene, amylene and hexylene as well as such polymethylene derivatives as trimethylene, tetramethylene, pentamethylene, and hexamethylene.

The organic bases described herein form salts which are non-toxic in therapeutic dosage with a variety of inorganic and strong organic acids, including sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary isoquinolinium salts with a variety of organic esters of sulfuric, hydrohalic and aromatic sulfonic acids. Among such esters are methyl chloride, bromide, and iodide; ethyl chloride, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide.

The compounds which constitute this invention are valuable because of their therapeutic properties. Specifically, they are potent vasodilator and blood pressure reducing agents.

The compounds of this invention can be conveniently prepared by three alternative reaction schemes which can be represented structurally as follows:

(1)

(2)

(3)

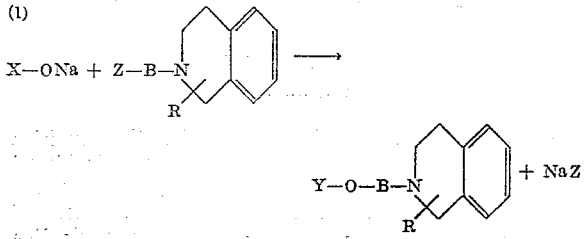

In these reactions Z represents a halogen atom and all other symbols are defined as hereinabove.

The invention is disclosed in further detail by the following examples which are set forth for the purpose of illustrating this invention, but are in no way to be construed as limiting it in spirit or in scope. It will be apparent to those skilled in the art of organic synthesis that many conventional modifications in methods, conditions and materials can be adopted without departing therefrom. In these examples temperatures are indicated in degrees centigrade, pressures in millimeters of mercury and quantities of materials are indicated in parts by weight.

Example 1

To a stirred mixture of 11 parts of sodium hydride in 880 parts of toluene heated to 90–95° C. there are added portionwise 47.5 parts of 3-pyridinol. The mixture is refluxed for 2 hours after which 98 parts of 2-($\beta$-chloroethyl)-1,2,3,4-tetrahydroisoquinoline in 880 parts of toluene are added portionwise. Refluxing is continued for 6 hours and then 80 parts of ethanol are added. The unreacted pyridin-3-ol is extracted with 1000 parts of 10% aqueous sodium hydroxide solution. The toluene solution is washed with water, dried over anhydrous potassium carbonate, stirred with charcoal and filtered. The filtrate is concentrated under vacuum and the residue is distilled at about 0.12 mm. pressure and 155–157° C. to yield the 2-[$\beta$-(pyridoxy)ethyl]-1,2,3,4-tetrahydroisoquinoline.

A methanolic solution of 20 parts of this amine is treated with 35 parts of a 30% solution of hydrogen chloride in isopropanol. After chilling the precipitate is collected on a filter, dried and recrystallized from a mixture of methanol and acetone. The dihydrochloride thus obtained melts at about 235–237° C. It has the structural formula

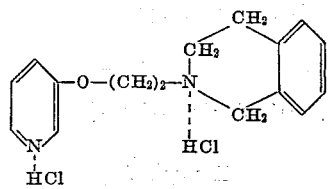

Example 2

To a mixture of 11 parts of sodium hydride in 880 parts of toluene are added in small portions 54.6 parts of 3-pyridinemethanol and the resulting mixture is heated at reflux for an hour. Then 98 parts of 2-($\beta$-chloroethyl)-1,2,3,4-tetrahydroisoquinoline in 3100 parts of toluene are added portionwise in the course of 15 minutes and refluxing is continued for 5 hours. The resulting mixture is cooled and washed with water, dried over anhydrous potassium carbonate and distilled at about 0.3 mm. pressure. At 162–167° C. there is collected the 2-[β-3'-pyridinemethoxy)ethyl]-1,2,3,4-tetrahydroisoquinoline.

Treatment of this base with alcoholic hydrogen chloride causes immediate precipitation of the dihydrochloride which, recrystallized from isopropanol, melts at about 140–150° C. with decomposition. It has the structural formula

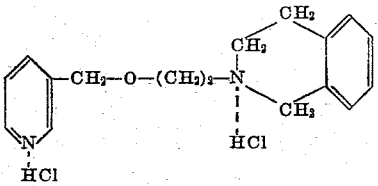

*Example 3*

A stirred mixture of 191 parts of 2-(β-hydroxypropyl)-1,2,3,4-tetrahydroisoquinoline, 30 parts of sodium hydride and 4400 parts of anhydrous toluene is refluxed for 4 hours and then treated by fairly rapid addition with 167 parts of 4-(β-chloroethyl)pyridine. Refluxing is continued for 4 hours, after which the reaction mixture is permitted to stand at room temperature for 10 hours and stirred with 50 parts of ethanol for an hour. Dilute aqueous hydrochloric acid is added and the aqueous layer is separated, rendered alkaline and extracted with ether. This extract is washed with water, dried over anhydrous potassium carbonate, filtered and evaporated to yield an oily residue which is distilled at about 0.3 mm. pressure. At about 175–185° C., there is collected the 2-[β-(4'-pyridineethoxy)propyl]-1,2,3,4-tetrahydroisoquinoline which has the structural formula

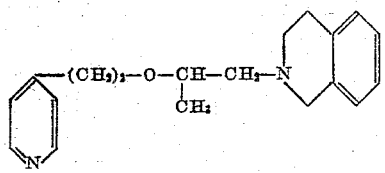

*Example 4*

A mixture of 382 parts of 3-methyl-1,2,3,4-tetrahydroisoquinoline-2-ethanol, 70 parts of sodium hydride and 8700 parts of anhydrous toluene is stirred and refluxed for 5 hours and then treated with 335 parts of 2-(β-chloroethyl)pyridine. Refluxing is continued for 3 hours, after which the mixture is cooled and treated with 250 parts of ethanol. The reaction mixture is then extracted with dilute hydrochloric acid and the extract is rendered alkaline and extracted with ether. The ether solution is dried over anhydrous potassium carbonate, filtered and evaporated to yield the 2-[β-(2'-pyridineethoxy)ethyl]-3-methyl-1,2,3,4-tetrahydroisoquinoline which is distilled at about 170–180° C. and 0.2–0.3 mm. pressure. The compound has the structural formula

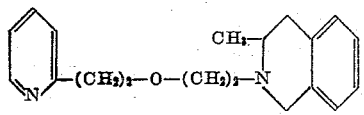

*Example 5*

To a mixture of 18.5 parts of sodium hydride in 1200 parts of anhydrous toluene a solution of 80 parts of 2-thiophenemethanol in 220 parts of toluene is added in small portions at room temperature. The mixture is then heated slowly to 95–100° C. and stirred at that temperature for 150 minutes. While the temperature is maintained at the same range and stirring is continued 137 parts of 2-(β-chloroethyl)-1,2,3,4-tetrahydroisoquinoline in 700 parts of toluene are added in the course of 50 minutes. Heating and stirring at about 100° C. is continued for 5 hours. The mixture is then chilled, stirred with 10 parts of ethanol and extracted with dilute hydrochloric acid. The extract is rendered alkaline by addition of dilute sodium hydroxide and then extracted with ether. This extract is dried over anhydrous potassium carbonate, filtered and evaporated to yield a residue which is distilled at about 151–153° C. and 0.13 mm. pressure to yield 2-[β-(2'-thiophenemethoxy)ethyl]-1,2,3,4,-tetrahydroisoquinoline which has the structural formula

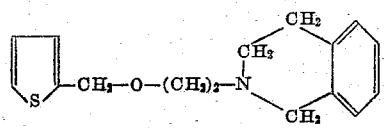

*Example 6*

A stirred mixture of 382 parts of 1-methyl-2-(β-hydroxyethyl)-1,2,3,4-tetrahydroisoquinoline and 70 parts of sodium hydride in 8700 parts of anhydrous toluene is heated at reflux for 2 hours and then treated by rapid addition with 450 parts of 2-(β-bromoethyl)thiophene. The mixture is heated for 3 hours at reflux with stirring and then treated with 75 parts of ethanol while stirring is continued for 2 hours. The reaction mixture is then extracted with dilute hydrochloric acid, and the extract is made alkaline by addition of sodium hydroxide and extracted with ether. This extract is dried over anhydrous potassium carbonate, filtered and evaporated. The residue is distilled at about 160–170° C. and 0.1–0.15 mm. pressure to yield the 1-methyl-2-[β-(2'-thiopheneethoxy)ethyl] - 1,2,3,4 - tetrahydroisoquinoline which has the structural formula

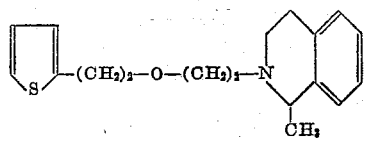

*Example 7*

To a stirred mixture of 12 parts of sodium hydride in 900 parts of dry toluene are added 49 parts of furfuryl alcohol in 175 parts of toluene. The mixture is heated to 100° C. and maintained at that temperature for 2 hours, after which 108 parts of 2-(β-chloroethyl)-1,2,3,4-tetrahydroisoquinoline in 440 parts of toluene are added portionwise over a period of 20 minutes. The temperature is maintained at 100° C. with stirring for 5 hours after which the mixture is cooled and treated with 30 parts of ethanol and a large volume of dilute hydrochloric acid. The aqueous layer is separated, rendered alkaline and extracted with ether. This extract is dried over anhydrous calcium sulfate, filtered and evaporated and the residue is distilled at 0.1–0.15 mm. pressure. At about 136–137° C. there is collected the 2-[β-(2'-furylmethoxy)ethyl] - 1,2,3,4 - tetrahydroisoquinoline. This base is dissolved in anhydrous ether and treated with 1.3 equivalents of a 25% solution of anhydrous hydrogen chloride in isopropanol. On concentration an oily hydrochloride is obtained which crystallizes on standing and melts at about 119–124° C. The salt has the structural formula

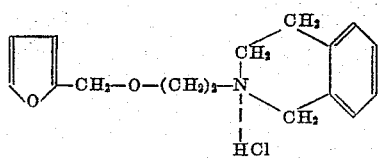

*Example 8*

An agitated mixture of 24 parts of sodium hydride in 1800 parts of anhydrous toluene is treated with 98 parts of furfuryl alcohol in 350 parts of toluene and heated at 100° C. for 2 hours. Then 246 parts of 2 - (δ - chlorobutyl) - 1,2,3,4 - tetrahydroisoquinoline in 1000 parts of anhydrous toluene are added in the course of 30 minutes and heating at 100° C. with stirring is continued for 6 hours. The mixture is then cooled and treated with 100 parts of ethanol and a large volume of dilute hydrochloric acid. The aqueous layer is isolated, rendered alkaline by addition of dilute sodium hydroxide and extracted with ether. This ether extract is dried over anhydrous potassium carbonate, filtered and evaporated and the residue is distilled at about 140–150° C. and about 0.1 mm. pressure to yield 2-(δ-furylmethoxybutyl)-1,2,3,4-tetrahydroisoquinoline which has the structural formula

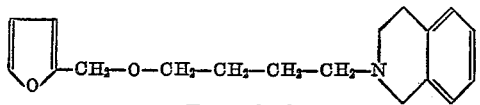

*Example 9*

To a stirred mixture of 18.5 parts of sodium hydride in 1250 parts of toluene 71.4 parts of tetrahydrofurfuryl alcohol are added portionwise at room temperature. After heating at 100–105° C. for 3 hours there are added 137 parts of 2-(β-chloroethyl)-1,2,3,4-tetrahydroisoquinoline in 700 parts of anhydrous toluene in the course of 50 minutes. Heating and stirring at 100° C. are continued for 7 hours after which the mixture is cooled and treated with 25 parts of ethanol and a large volume of aqueous hydrochloric acid. The aqueous layer is separated, rendered alkaline by addition of dilute potassium hydroxide and extracted with ether. This ether extract is dried over anhydrous potassium carbonate, filtered and evaporated and the residue is distilled at about 0.1–0.15 mm. pressure. At about 139–144° C. there is collected the 2-[β-(2-tetrahydrofurylmethoxy)ethyl]-1,2,3,4-tetrahydroisoquinoline which has the structural formula

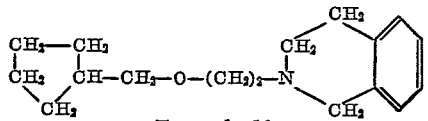

*Example 10*

To an agitated mixture of 12 parts of sodium hydride in 900 parts of anhydrous toluene are added 72.5 parts of 5-(2'-tetrahydrofuryl)-1-pentanol in 300 parts of toluene. The mixture is heated at 100° C. for 2 hours, after which 108 parts of 2-(β-chloroethyl)-1,2,3,4-tetrahydroisoquinoline in 450 parts of toluene are added portionwise in the course of 15 minutes. Stirring and heating at 100° C. is continued for 5 hours, after which the mixture is cooled, treated with 30 parts of ethanol and a large volume of dilute hydrochloric acid. The aqueous layer is separated, made alkaline by addition of dilute potassium hydroxide and extracted with ether. This ether extract is dried over anhydrous potassium carbonate, filtered and evaporated and the residue is distilled at about 165–175° C. and 0.1–0.2 mm. pressure to yield 2-[β-(ω-tetrahydrofurylpentoxy)ethyl]-1,2,3,4-tetrahydroisoquinoline which has the structural formula

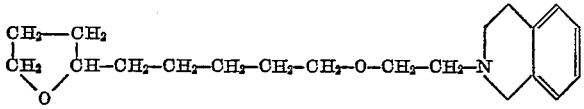

What is claimed is:

1. A compound of the structural formula

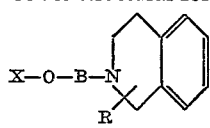

wherein B is a lower alkylene radical, R is a member of the class consisting of hydrogen and lower alkyl radicals, and X is a member of the class consisting of the pyridine radical and radicals of the formula

Y—A— wherein A is a lower alkylene radical and Y is a member of the class consisting of pyridyl, thienyl, furyl, and tetrahydrofuryl radicals.

2. A compound of the structural formula

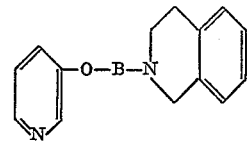

wherein B is a lower alkylene radical.

3.

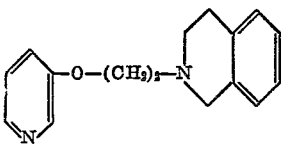

4. A compound of the structural formula

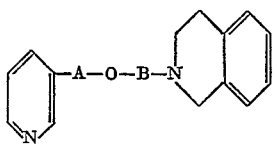

wherein A and B are lower alkylene radicals.

5.

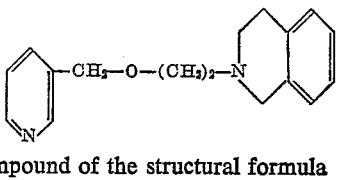

6. A compound of the structural formula

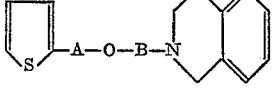

wherein A and B are lower alkylene radicals.

7.

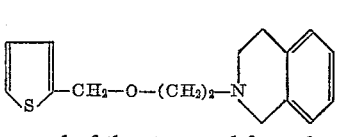

8. A compound of the structural formula

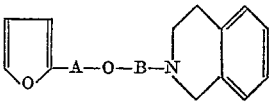

wherein A and B are lower alkylene radicals.

9.

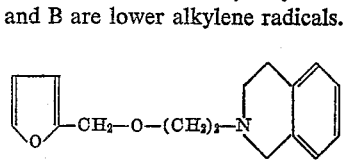

10. A compound of the structural formula

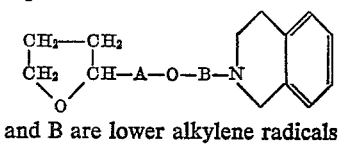

wherein A and B are lower alkylene radicals.

11.

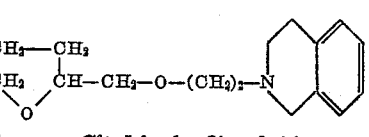

References Cited in the file of this patent

Braun et al.; Ber. der. Deutsch Chem., vol. 55B, pp. 1666–80 (1922).